United States Patent
Yamaguchi et al.

(10) Patent No.: US 9,744,921 B2
(45) Date of Patent: Aug. 29, 2017

(54) ENGINE HOOD (71) Applicant: Kobe Steel, Ltd., Hyogo (JP)

(72) Inventors: Zenzo Yamaguchi, Kobe (JP); Ichiro Yamagiwa, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/113,469

(22) PCT Filed: Feb. 5, 2015

(86) PCT No.: PCT/JP2015/053292
§ 371 (c)(1),
(2) Date: Jul. 22, 2016

(87) PCT Pub. No.: WO2015/122357
PCT Pub. Date: Aug. 20, 2015

(65) Prior Publication Data
US 2017/0001579 A1 Jan. 5, 2017

(30) Foreign Application Priority Data

Feb. 13, 2014 (JP) .................... 2014-025737

(51) Int. Cl.
*B65D 25/10* (2006.01)
*B60R 13/08* (2006.01)
*B62D 25/10* (2006.01)
*B60K 13/02* (2006.01)

(52) U.S. Cl.
CPC .......... *B60R 13/0838* (2013.01); *B60K 13/02* (2013.01); *B62D 25/105* (2013.01)

(58) Field of Classification Search
CPC ............................. B62D 25/10; B62D 25/105

USPC .................. 180/69.21, 69.2, 69.22
See application file for complete search history.

(56) References Cited

U.S. PATENT DOCUMENTS

| 3,647,256 A * | 3/1972 | Cox ................... B60J 1/2005 296/91 |
| 3,800,910 A * | 4/1974 | Rose .................. F02M 35/162 181/229 |
| 4,335,797 A * | 6/1982 | Simmons ............ B60R 13/0838 165/135 |

(Continued)

FOREIGN PATENT DOCUMENTS

| JP | 04-284154 A | 10/1992 |
| JP | 08-113164 A | 5/1996 |

(Continued)

OTHER PUBLICATIONS

International Search Report issued in PCT/JP2015/053292; dated Mar. 17, 2015.

(Continued)

*Primary Examiner* — Jeffrey J Restifo
(74) *Attorney, Agent, or Firm* — Studebaker & Brackett PC (57) ABSTRACT

Provided is an engine hood comprising: an outer panel that constitutes an outer part of the engine hood; and an inner panel that constitutes an inner part of the engine hood and that is joined to the outer panel such that a space is formed between the inner panel and the outer panel. A porous section that comprises a plurality of through holes is provided to the inner panel. An external air intake hole that guides external air into the space is provided to the engine hood.

6 Claims, 4 Drawing Sheets

(56) References Cited

U.S. PATENT DOCUMENTS

| | | | | |
|---|---|---|---|---|
| 4,646,864 | A * | 3/1987 | Racchi | B60K 11/08 180/69.22 |
| 4,932,490 | A * | 6/1990 | Dewey | B60K 13/02 180/68.3 |
| 4,971,172 | A * | 11/1990 | Hoffman | B60K 13/02 180/68.3 |
| 5,054,567 | A * | 10/1991 | Hoffman | B62D 25/10 180/68.2 |
| 5,618,323 | A * | 4/1997 | Shearn | B60H 1/28 180/68.3 |
| 5,660,243 | A * | 8/1997 | Anzalone | B60K 13/02 180/68.1 |
| 5,794,733 | A * | 8/1998 | Stosel | B60K 13/02 180/68.1 |
| 6,056,075 | A * | 5/2000 | Kargilis | B62D 25/105 180/68.1 |
| 6,302,228 | B1 * | 10/2001 | Cottereau | B60K 11/08 180/68.1 |
| 6,662,892 | B2 * | 12/2003 | Falk | B60K 11/08 180/68.1 |
| 8,028,782 | B2 * | 10/2011 | Goda | B60R 13/0838 180/68.3 |
| 8,052,198 | B2 * | 11/2011 | Seksaria | B62D 25/105 180/69.2 |
| 8,205,699 | B2 * | 6/2012 | Ohzono | B60K 13/02 180/68.3 |
| 2004/0200649 | A1 * | 10/2004 | Yatsuda | B62D 25/10 180/69.2 |
| 2004/0262061 | A1 * | 12/2004 | Bahr | B60K 11/08 180/69.2 |
| 2006/0006698 | A1 * | 1/2006 | Ishikawa | B62D 25/105 296/193.11 |
| 2006/0048986 | A1 * | 3/2006 | Bracciano | B60H 1/28 180/69.2 |
| 2007/0007062 | A1 | 1/2007 | Ogawa et al. | |
| 2016/0159211 | A1 * | 6/2016 | Nakagawa | B60K 1/04 180/65.31 |
| 2017/0001579 | A1 * | 1/2017 | Yamaguchi | B60R 13/0838 |

FOREIGN PATENT DOCUMENTS

| | | |
|---|---|---|
| JP | H08-258669 A | 10/1996 |
| JP | 2001-247055 A | 9/2001 |
| JP | 2004-334022 A | 11/2004 |
| JP | 2009-501673 A | 1/2009 |

OTHER PUBLICATIONS

Written Opinion issued in PCT/JP2015/053292; dated Mar. 17, 2015.

* cited by examiner

ENGINE HOOD

TECHNICAL FIELD

The present invention relates to an engine hood.

BACKGROUND ART

In automobiles such as passenger cars, trucks, and buses, noise is caused in an engine room while an engine is operating. Such noise is transmitted from the inside of the engine room to the outside and inside of a vehicle compartment.

Patent Document 1 discloses a sound absorbing material attached to a lower surface of a hood panel to absorb engine noise of an automobile and made of a porous base material. The porous base material is made of organic fibers such as polyester fibers or polyethylene fibers, or is made of a plastic foaming body with an open-cell structure, such as a polyester foaming body or polyethylene foaming body.

However, such a sound absorbing material is typically effective to noise outside a vehicle compartment, i.e., noise in a frequency band with a relatively-high frequency of equal to or higher than 1000 kHz. However, the sound absorbing material is less effective to noise inside the vehicle compartment, i.e., noise in a low frequency band of equal to or lower than 1000 Hz.

Thus, Patent Document 2 discloses a soundproof engine hood configured to reduce noise inside a vehicle compartment by a sound absorbing effect of a resonance sound absorbing pipe provided in an engine hood. Moreover, Patent Document 3 discloses a muffling device of an internal combustion engine configured such that a resonance muffling chamber communicating with an air intake path of the engine is provided in a hollow reinforcing frame attached to a rear surface of an engine hood.

CITATION LIST

Patent Document

Patent Document 1: JP 2004-334022
Patent Document 2: JP 2001-247055
Patent Document 3: JP 04-284154

SUMMARY OF THE INVENTION

Technical Problem

However, the Helmholtz resonators disclosed in Patent Documents 2 and 3 basically act only on a single frequency. For this reason, a wide variety of noise in a low frequency band of equal to or lower than 1000 Hz cannot be reduced.

The present invention is intended to provide an engine hood capable of reducing a wide variety of noise in a low frequency band in an engine room.

Solution to Problem

The engine hood of the present invention is an engine hood covering an engine room provided at a front portion of a vehicle. The engine hood includes an outer panel forming an outer portion of the engine hood, and an inner panel joined to the outer panel such that a space is formed between the inner panel and the outer panel and forming an inner portion of the engine hood. The inner panel includes a porous portion provided with a plurality of through-holes, and the engine hood is provided with an external air intake hole through which external air is introduced into the space.

Advantageous Effects of the Invention

According to the present invention, since the space between the outer panel and the inner panel communicates with the engine room through the porous portion, the hollow engine hood acts as a Helmholtz resonator. This can reduce noise in a low frequency band in the engine room. Moreover, when sound waves from an engine pass through the through-holes, part of sound wave energy is converted into thermal energy by friction with an inner wall surface of each through-hole. After the sound waves have passed through the through-holes, eddies are caused at the outlet and inlet of each through-hole due to the alternating flow of the sound waves, leading to a pressure loss. This results in greater attenuation by the holes. Thus, a wide variety of noise in the low frequency band in the engine room can be reduced. In addition, the external air introduced into the space through the external air intake hole passes, as a steady flow (wind), through the through-holes. Due to the eddies caused when such a steady flow passes through the through-holes, the sound waves from the engine are simultaneously attenuated when passing through the through-holes. As a result, the sound wave energy lost in the holes increases. For this reason, sound wave attenuation becomes greater, and a sound absorption coefficient increases in a wide low frequency band. Consequently, a wide variety of noise in the low frequency band in the engine room can be reduced.

DESCRIPTION OF EMBODIMENTS

Hereinafter, suitable embodiments of the present invention will be described with reference to drawings.

[First Embodiment]
(Vehicle Configuration)

Figure 1:
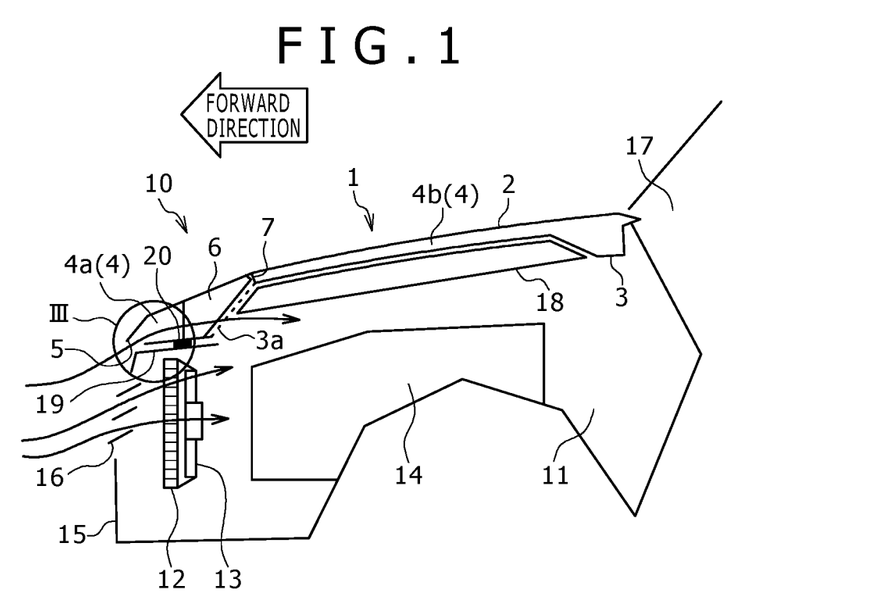
FIG. 1 is a cross-sectional view of a front portion of a vehicle.

An engine hood 1 of a first embodiment of the present invention is, as illustrated in FIG. 1, provided at a vehicle 10 such as an automobile. The vehicle 10 includes an engine room 11 at a front portion of the vehicle 10 in a forward direction indicated by an arrow in FIG. 1. A radiator 12, a cooling fan 13, and an engine 14 are arranged in this order from the front side toward the rear side in the engine room 11. A front wall 15 defining a front end of the engine room 11 is provided with an external air intake port 16 through which external air is introduced into the engine room 11. An upper portion of the engine room 11 is openably covered with the engine hood 1. A vehicle compartment 17 in which a driver operates the vehicle 10 is provided on the rear side of the engine room 11.

(Engine Hood Configuration)

The engine hood 1 of the present embodiment is made of metal, and includes an outer panel 2 and an inner panel 3. The outer panel 2 forms an outer portion of the engine hood 1. The inner panel 3 is, by, e.g., welding, joined to the outer panel 2 such that a space 4 is formed between the inner panel 3 and the outer panel 2, and forms an inner portion of the engine hood 1.

The inner panel 3 includes a porous portion 3a provided with a plurality of through-holes. The porous portion 3a communicates with the space 4. The diameter of each through-hole of the porous portion 3a is 0.3 mm to 5 mm, and preferably equal to or greater than 1 mm, for example. When the diameter of each through-hole is equal to or greater than 1 mm, a later-described steady flow can suitably pass through the through-holes. Moreover, the aperture ratio of the porous portion 3a is about 1% to about 5%, for example. Note that the diameter of the through-hole and the aperture ratio are not limited to the above-described values.

A sound absorbing material 18 is attached to the surface of the inner panel 3 close to the engine room 11. The sound absorbing material 18 is made of a porous material such as glass wool. The sound absorbing material 18 is disposed on the rear side of the porous portion 3a to face the engine 14. Thus, the sound absorbing material 18 absorbs noise in the engine room 11, particularly noise in a high frequency band.

The engine hood 1 is provided with an external air intake hole 5 through which external air is introduced into the space 4. The external air intake hole 5 is provided at the position on the front side of the porous portion 3a, and in the present embodiment, is provided at a front end of the engine hood 1. Note that the external air intake hole 5 may be provided at the boundary between the outer panel 2 and the inner panel 3, or may be provided at the outer panel 2 or the inner panel 3. In the present embodiment, the external air intake hole 5 is provided at the inner panel 3.

With the external air intake hole 5 provided at the engine hood 1, part of external air flowing from the front side toward the rear side of the vehicle 10 is introduced into the space 4 through the external air intake hole 5 while the vehicle 10 is running in the forward direction. Subsequently, the external air introduced into the space 4 passes, as a steady flow (wind), through the through-holes of the porous portion 3a, and then, is introduced into the engine room 11. Such air is discharged to the outside of the engine room 11 through a plurality of not-shown vent holes communicating with the engine room 11.

Figure 2:
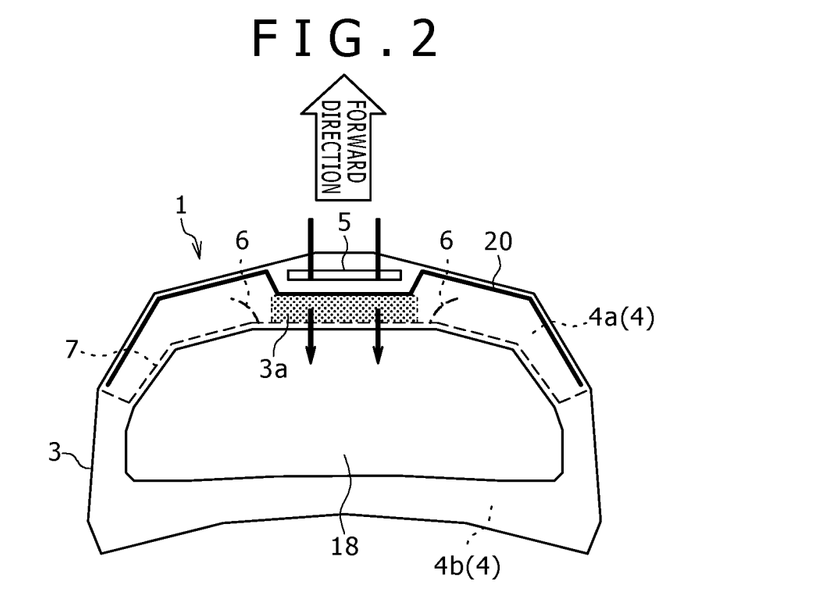
FIG. 2 is a view of an engine hood from below.

The engine hood 1 includes a pair of guides 6 in the space 4. FIG. 2 is a view of the engine hood 1 from below. As illustrated in FIG. 2, the pair of guides 6 is configured to guide, to the porous portion 3a, the external air introduced into the space 4 through the external air intake hole 5.

The engine hood 1 includes a partitioning member 7 configured to divide the space 4 into a communication space 4a communicating with the porous portion 3a and the external air intake hole 5 and a closed space 4b. The porous portion 3a and the communication space 4a form a Helmholtz resonator. The resonance frequency targeted for sound absorption by the resonator varies depending on the volume of the communication space 4a. A greater volume of the communication space 4a results in a lower resonance frequency. Since the space 4 is divided by the partitioning member 7, the volume of the communication space 4a is optimized so that the Helmholtz resonator formed of the porous portion 3a and the communication space 4a can absorb noise with the frequency targeted for sound absorption.

A sealing member 20 is attached to the surface of the inner panel 3 close to the engine room 11. As illustrated in FIG. 1, the sealing member 20 is configured to seal the clearance between the inner panel 3 and an upper wall 19 protruding from an upper end of the front wall 15, which defines the front end of the engine room 11, toward the rear side to face the inner panel 3 when the upper portion of the engine room 11 is covered with the engine hood 1. With this configuration, when the vehicle 10 moves forward, external air is not introduced into the engine room 11 through the clearance between the upper wall 19 and the inner panel 3, but is introduced into the space 4 through the external air intake hole 5.

Figure 3A:
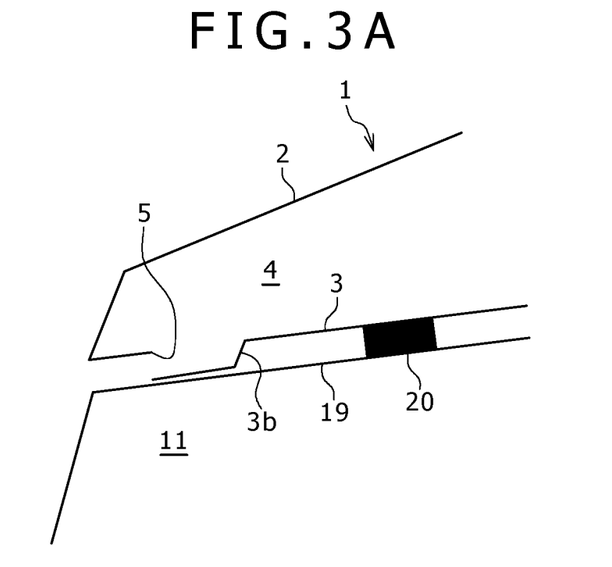
FIG. 3A is an enlarged view of a main portion III of FIG. 1.

As illustrated in FIG. 3A as an enlarged view of a main portion III of FIG. 1, the inner panel 3 is provided with an upstream guide 3b configured to guide external air toward the external air intake hole 5. The upstream guide 3b is provided to extend from the lower side of the external air intake hole 5 toward the rear side in the forward direction (see FIG. 1). The left end of the upstream guide 3b as viewed in FIG. 3A is separated from the external air intake hole 5, and is positioned in the vicinity of the upper wall 19. The right end of the upstream guide 3b as viewed in FIG. 3A is connected to the inner panel 3. The external air entering the clearance between the upper wall 19 and the inner panel 3 is guided to the external air intake hole 5 by the upstream guide 3b. Then, such air is introduced into the space 4 through the external air intake hole 5. As described above, since external air is guided to the external air intake hole 5 by the upstream guide 3b, external air can be easily taken through the external air intake hole 5.

Figure 3B:
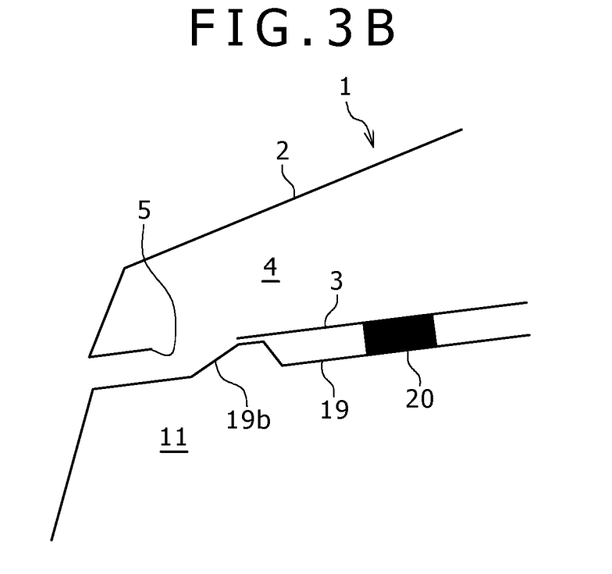
FIG. 3B is an enlarged view of the main portion III of FIG. 1.

Note that as illustrated in FIG. 3B as an enlarged view of the main portion III of FIG. 1, an upstream guide 19b may be provided at the upper wall (a wall portion) 19. At part of the upper wall 19 facing the external air intake hole 5, the upstream guide 19b is provided in the shape raised toward the external air intake hole 5. The upstream guide 19b has the surface extending from the lower side of the external air intake hole 5 toward the rear side in the forward direction (see FIG. 1) to incline to the external air intake hole 5. An external air intake path is formed between such an inclined surface and the external air intake hole 5. Even with the upstream guide 19b described above, external air can be easily taken through the external air intake hole 5.

Figure 4:
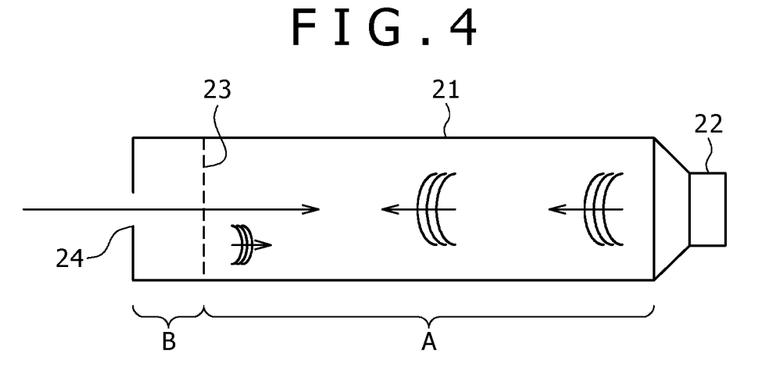
FIG. 4 is a conceptual diagram of an embodiment of the present invention.

A conceptual diagram of the present embodiment is illustrated in FIG. 4. A speaker 22 as a sound source is attached to one end of a sound tube 21, and a porous plate 23 provided with a plurality of through-holes is placed in the sound tube 21. An external air intake hole 24 is provided at the other end of the sound tube 21. The speaker 22 corresponds to the engine 14, the space A between the speaker 22 and the porous plate 23 corresponds to the inside of the engine room 11, and the space B between the porous plate 23 and the other end of the sound tube 21 corresponds to the space 4 (the communication space 4a) between the outer panel 2 and the inner panel 3.

In such a configuration, noise is, as illustrated in FIG. 1, caused in the engine room 11 during operation of the engine 14. Such noise is transmitted from the inside of the engine room 11 to the outside of the engine room 11, i.e., the outside of the vehicle compartment 17, and then, is transmitted to the inside of the vehicle compartment 17. Since the space 4 between the outer panel 2 and the inner panel 3 communicates with the engine room 11 through the porous portion 3a, the hollow engine hood 1 acts as the Helmholtz resonator. This can reduce noise in a low frequency band in the engine room 11. In FIG. 4, the porous plate 23 and the space B act as a Helmholtz resonator.

However, the Helmholtz resonator basically acts only on a single frequency (a resonance frequency). For this reason, in the present embodiment, the plurality of through-holes of the porous portion 3*a* of the inner panel 3 absorb a wide variety of noise in the low frequency band in the engine room 11. That is, when sound waves from the engine 14 pass through the through-holes, part of sound wave energy is converted into thermal energy due to friction with an inner wall surface of each through-hole. After the sound waves have passed through the through-holes, eddies are caused at the outlet and inlet of each through-hole due to the alternating flow of the sound waves, leading to a pressure loss. This results in greater attenuation by the holes. Thus, a wide variety of noise in the low frequency band in the engine room 11 can be reduced. For example, noise outside the vehicle compartment, i.e., noise in a low frequency band of equal to or lower than 1000 Hz can be reduced. In FIG. 4, the sound waves passing through the through-holes of the porous plate 23 are attenuated.

In addition, in the present embodiment, the external air introduced into the space 4 through the external air intake hole 5 passes, as illustrated in FIG. 1, through the through-holes as a steady flow (wind). Due to the eddies caused when such a steady flow passes through the through-holes, the sound waves from the engine 14 are simultaneously attenuated when passing through the through-holes. As a result, the sound wave energy lost in the holes increases. For this reason, sound wave attenuation becomes greater, and a sound absorption coefficient increases in a wide low frequency band. Consequently, a wide variety of noise in the low frequency band in the engine room 11 can be reduced. In FIG. 4, the steady flow passing through the porous plate 23 by way of the external air intake hole 24 enhances sound wave attenuation. Thus, the sound waves output from the speaker 22 and reflected on the porous plate 23 are weaker than the sound waves output from the speaker 22.

A sound wave is a longitudinal wave (a compressional wave). For this reason, when passing through the through-holes, the sound waves are simultaneously attenuated due to the eddies caused when the steady flow passes through each through-hole even if the direction of the steady flow is the same as or opposite to the traveling direction of the sound wave. Note that in the case where the direction of the steady flow is the same as the traveling direction of the sound wave in FIG. 1 (i.e., the case where the direction of the steady flow is opposite to the direction indicated by the arrow in FIG. 1), the steady flow tends to direct toward a region with a lower pressure loss. For this reason, the steady flow does not tend to direct toward the through-holes, but tends to direct toward the not-shown vent holes communicating with the engine room 11. As a result, a majority portion of the steady flow does not pass through the through-holes, leading to a smaller effect of the steady flow. On the other hand, in the case where the direction of the steady flow is opposite to the traveling direction of the sound wave as in the present embodiment, there is nowhere that the steady flow can pass through, except for the through-holes. Thus, the steady flow can suitably pass through the through-holes, leading to a greater effect of the steady flow.

As illustrated in FIG. 1, since the engine hood 1 is provided with the external air intake hole 5 positioned on the front side of the porous portion 3*a*, external air can be constantly introduced into the communication space 4*a* through the external air intake hole 5 while the vehicle 10 is running. Thus, while the vehicle 10 is running, the steady flow constantly passes through the through-holes. Consequently, a sound wave attenuation effect can be suitably enhanced.

As illustrated in FIG. 2, the volume of the communication space 4*a* can be freely changed by the partitioning member 7 dividing the space 4 into the communication space 4*a* and the closed space 4*b*. With this configuration, the volume of the communication space 4*a* can be optimized such that the Helmholtz resonator formed of the porous portion 3*a* and the communication space 4*a* absorbs noise with the frequency targeted for sound absorption. In FIG. 4, the volume of the space B is optimized depending on the frequency targeted for sound absorption.

Moreover, as illustrated in FIG. 2, the external air introduced into the communication space 4*a* through the external air intake hole 5 is guided to the porous portion 3*a* by the guides 6, and therefore, it is ensured that the air passes through the through-holes. Thus, the steady flow passing through the through-holes can be suitably generated.

Further, as illustrated in FIGS. 3A and 3B, the external air is guided to the external air intake hole 5 by the upstream guides 3*b*, 19*b*, and therefore, can be easily taken through the external air intake hole 5. As a result, more external air can be taken through the external air intake hole 5.

(Sound Absorption Coefficient Measurement)

Figure 5:
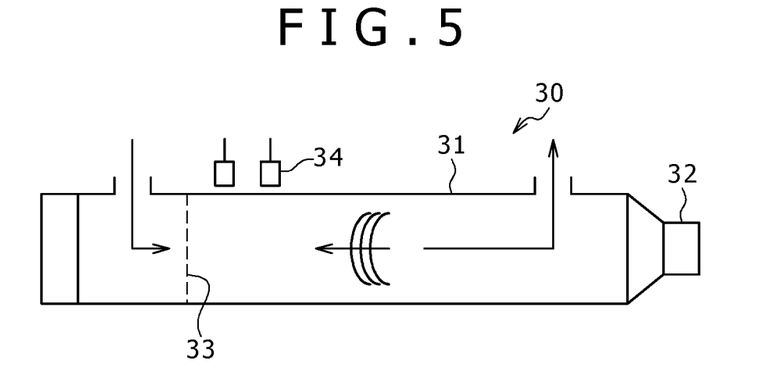
FIG. 5 is a schematic configuration diagram of a sound tube experimental device.
Figure 6:
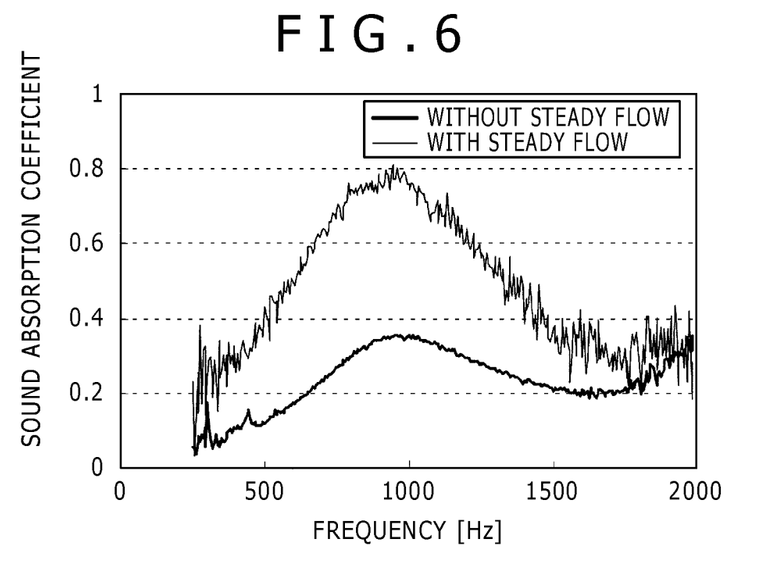
FIG. 6 is a graph of measurement results of a sound absorption coefficient.

Next, results of measurement of a change in a sound absorption coefficient due to a steady flow passing through a porous plate will be described. FIG. 5 is a schematic configuration diagram of a sound tube experimental device 30. As illustrated in FIG. 5, the sound tube experimental device 30 is configured such that a porous plate 33 provided with a plurality of through-holes is placed in a sound tube 31 whose one end is attached to a speaker 32. In both of the case where an air flow circulates in the sound tube 31 such that a steady flow passes through the porous plate 33 and the case where an air flow does not circulate in the sound tube 31 such that no steady flow passes through the porous plate 33, the sound from the speaker 32 was measured by a microphone 34. The sound absorption coefficient of the porous plate 33 was measured based on the obtained sound measurement results. Note that the direction of the steady flow passing through the porous plate 33 is opposite to a sound wave traveling direction. The results are shown in FIG. 6. In the case where the steady flow passes through the porous plate 33, the results show that the sound absorption coefficient of the porous plate 33 increases in a wide low frequency band of 250 Hz to 1750 Hz.

(Advantageous Effects)

According to the engine hood 1 of the present embodiment, the space 4 between the outer panel 2 and the inner panel 3 communicates with the engine room 11 through the porous portion 3*a* as described above, and therefore, the hollow engine hood 1 acts as the Helmholtz resonator. Thus, noise in the low frequency band in the engine room 11 can be reduced. Moreover, when the sound waves from the engine 14 pass through the through-holes, part of the sound wave energy is converted into the thermal energy due to friction with the inner wall surface of each through-hole. After the sound waves have passed through the through-holes, the eddies are caused at the outlet and inlet of each through-hole due to the alternating flow of the sound waves, leading to the pressure loss. This results in greater sound wave attenuation by the holes. Thus, a wide variety of noise in the low frequency band in the engine room 11 can be reduced. In addition, the external air introduced into the space 4 through the external air intake hole 5 passes through the through-holes as the steady flow (wind). Due to the eddies caused when the steady flow passes through the through-holes, the sound waves from the engine 14 are simultaneously attenuated when passing through the through-holes. As a result, the sound wave energy lost in the holes increases. For this reason, sound wave attenuation becomes greater, and the sound absorption coefficient increases in a wide low frequency band. Consequently, a wide variety of noise in the low frequency band in the engine room 11 can be reduced.

Since the engine hood 1 is provided with the external air intake hole 5 positioned on the front side of the porous portion 3a, external air can be constantly introduced into the space 4 through the external air intake hole 5 while the vehicle 10 is running. Thus, while the vehicle 10 is running, the steady flow constantly passes through the through-holes. Consequently, the sound wave attenuation effect can be suitably enhanced.

The volume of the communication space 4a can be changed by the partitioning member 7 dividing the space 4 into the communication space 4a and the closed space 4b. With this configuration, the volume of the communication space 4a can be optimized such that the Helmholtz resonator formed of the porous portion 3a and the communication space 4a absorbs noise with the frequency targeted for sound absorption.

The external air introduced into the space 4 through the external air intake hole 5 is guided to the porous portion 3a by the guides 6, and therefore, it is ensured that the air passes through the through-holes. Thus, the steady flow passing through the through-holes can be suitably generated.

External air is guided to the external air intake hole 5 by the upstream guides 3b, 19b, and therefore, can be easily taken through the external air intake hole 5. As a result, more external air can be taken through the external air intake hole 5.

[Second Embodiment]
(Engine Hood Configuration)

Figure 7:
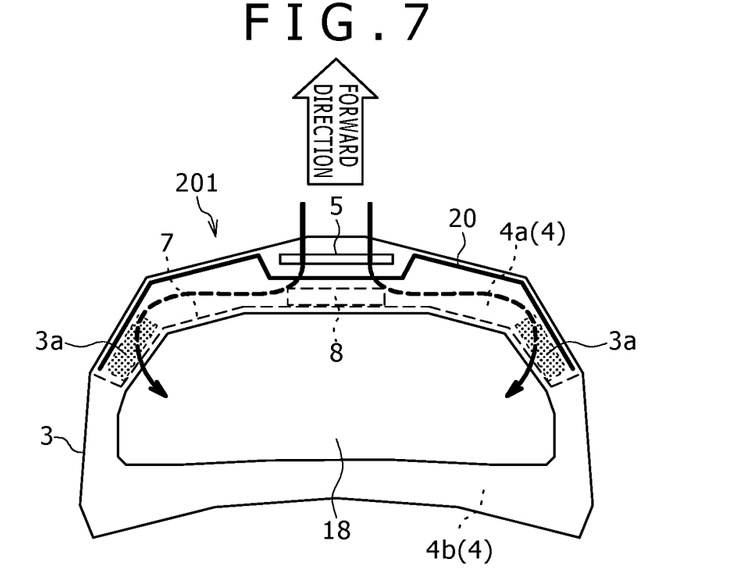
FIG. 7 is a view of an engine hood from below.

Next, an engine hood 201 of a second embodiment of the present invention will be described. Note that the same reference numerals as those used for the above-described components are used to represent equivalent elements, and description thereof will not be repeated. FIG. 7 is a view of the engine hood 201 of the present embodiment from below. The engine hood 201 of the present embodiment illustrated in FIG. 7 is different from the engine hood 1 of the first embodiment in that a porous portion 3a is provided at an inner panel 3 at the most downstream position in the flow of external air introduced into a communication space 4a through an external air intake hole 5 and flowing in the communication space 4a.

The external air introduced into the communication space 4a through the external air intake hole 5 flows in the communication space 4a. Such air passes, as a steady flow (wind), through through-holes of the porous portion 3a provided at the most downstream position in the flow of the air, and then, is introduced into an engine room 11. Thus, it is ensured that the external air passes through the through-holes, and the steady flow passing through the through-holes can be suitably generated.

The engine hood 201 includes a sound absorbing material 8 provided in the communication space 4a. The sound absorbing material 8 contains a porous material such as glass wool. The sound absorbing material 8 is configured to absorb noise in a high-frequency band, the noise entering the communication space 4a through the porous portion 3a. Thus, a wider band can be targeted for sound absorption.

Note that the engine hood 201 may include a not-shown sound absorption mechanism instead of the sound absorbing material 8 or in addition to the sound absorbing material 8. Examples of the sound absorption mechanism include the mechanism including a porous plate provided with a plurality of through-holes, a back plate disposed to face the porous plate with a predetermined distance from the porous plate, and a frame body surrounding the space between the porous plate and the back plate. According to such a sound absorption mechanism, the porous plate and the space form a Helmholtz resonator, and such a resonator provides an effect of reducing noise with a resonance frequency and absorbing sound waves passing through the through-holes.

(Advantageous Effects)

According to the engine hood 201 of the present embodiment, the porous portion 3a is, as described above, provided at the most downstream position in the flow of external air introduced into the communication space 4a through the external air intake hole 5 and flowing in the communication space 4a. Thus, it is ensured that the external air passes through the through-holes, and the steady flow passing through the through-holes can be suitably generated.

The sound absorbing material 8 is provided in the communication space 4a to absorb the noise entering the communication space 4a from the engine room 11. Thus, a wider band can be targeted for sound absorption.

The sound absorbing mechanism including the Helmholtz resonator formed of the porous plate and the space is provided in the communication space 4a, and therefore, the noise entering the communication space 4a from the engine room 11 can be absorbed by a sound absorption effect by the through-holes and a sound absorption effect by a resonance principle. Thus, a wider band can be targeted for sound absorption.

(Variations of the Embodiments)

The embodiments of the present invention have been described above, but have been set forth merely as specific examples. These embodiments are not intended to limit the present invention, and design change can be optionally made to, e.g., a specific configuration. Moreover, the features and advantageous effects described in the embodiments of the present invention have been merely listed as most preferable features and advantageous effects of the present invention, and the features and advantages effects of the present invention are not limited to those described in the embodiments of the present invention.

This application is based on the Japanese patent application (Japanese Patent Application No. 2014-25737) filed on Feb. 13, 2014, the entire contents of which are incorporated by reference herein.

EXPLANATION OF REFERENCE NUMERALS 1, 201 engine hood
2 outer panel
3 inner panel
3a porous portion
3b upstream guide
4 space
4a communication space
4b closed space
5 external air intake hole
6 guide
7 partitioning member
8 sound absorbing material 10 vehicle
11 engine room
16 external air intake port
18 sound absorbing material
19 upper wall (wall portion)
19b upstream guide

The invention claimed is:

1. An engine hood covering an engine room provided at a front portion of a vehicle, comprising:
    an outer panel forming an outer portion of the engine hood; and
    an inner panel joined to the outer panel such that a space is formed between the inner panel and the outer panel and forming an inner portion of the engine hood,
    a sealing member provided between an upper wall of a front end of the engine room and a lower surface of the inner panel,
    wherein the inner panel includes a porous portion provided with a plurality of through-holes, and
    the engine hood is provided with an external air intake hole through which external air is introduced into the space, the external air intake hole is provided at a position on a front side of the porous portion and the sealing member in the engine hood, and
    the engine hood is provided with a guide member configured to guide the external air introduced through the external air intake hole into the space through the porous portion.

2. The engine hood of claim 1, further comprising:
    a partitioning member configured to divide the space into a closed space and a communication space communicating with the porous portion and the external air intake hole.

3. The engine hood of claim 1, wherein the porous portion is provided at the inner panel at a most downstream position in a flow of the external air introduced into the space through the external air intake hole and flowing in the space.

4. The engine hood of claim 1, wherein the external air intake hole is provided at the inner panel, and the inner panel or a wall portion defining the engine room and facing the inner panel is provided with an upstream guide configured to guide the external air toward the external air intake hole.

5. The engine hood of claim 1, wherein
    a sound absorbing material is provided in the space.

6. An engine hood covering an engine room provided at a front portion of a vehicle, comprising:
    an outer panel forming an outer portion of the engine hood; and
    an inner panel joined to the outer panel such that a space is formed between the inner panel and the outer panel and forming an inner portion of the engine hood,
    wherein the inner panel includes a porous portion provided with a plurality of through-holes,
    the engine hood is provided with an external air intake hole through which external air is introduced into the space, and
    a sound absorbing material is attached to a lower surface of the inner panel.

* * * * *